Feb. 7, 1928.
W. D. APPEL
1,658,546
BRAKE ADJUSTING AND OPERATING MEANS
Filed April 10, 1925
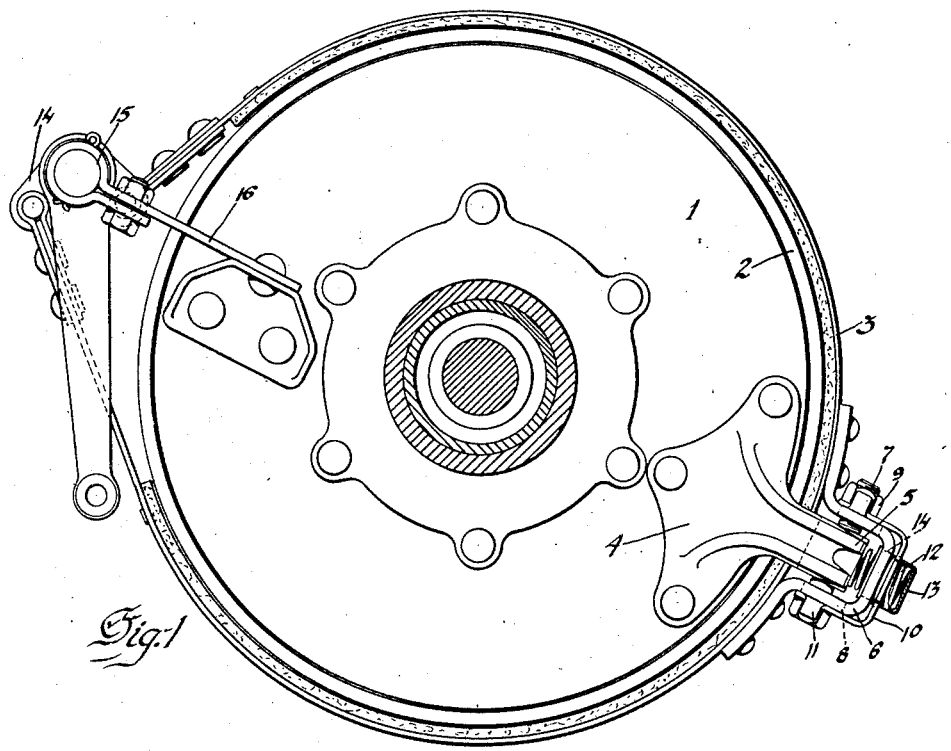
Fig.1
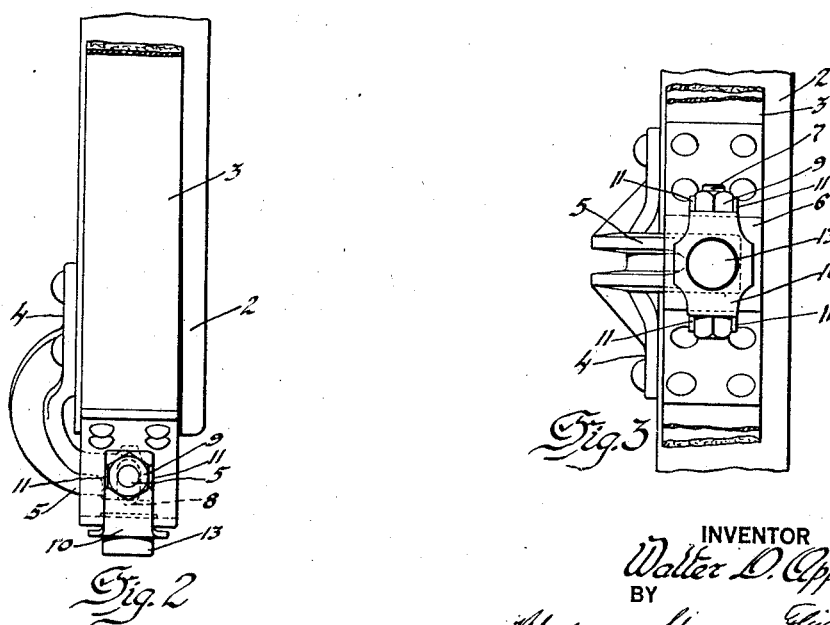
Fig.2
Fig.3
INVENTOR
Walter D. Appel
BY
Blackmore, Spencer & Flint
ATTORNEY Patented Feb. 7, 1928.

1,658,546

UNITED STATES PATENT OFFICE.

WALTER D. APPEL, OF PONTIAC, MICHIGAN, ASSIGNOR TO GENERAL MOTORS CORPORATION, OF DETROIT, MICHIGAN, A CORPORATION OF DELAWARE.

BRAKE ADJUSTING AND OPERATING MEANS.

Application filed April 10, 1925. Serial No. 22,226.

This invention relates to brakes.

It is an object of the present invention to provide a brake adjusting means which will permit the effective use of a brake structure of great simplicity. One form of brake structure falling within this category consists of a brake band operated by a rock shaft preferably non-adjustably connected to it and anchored at a point opposite the operating means. One difficulty encountered in the use of such a structure has been that it was impossible to secure uniform clearance between the brake band and the brake drum around the entire circumference of the latter. This was because of the fact that in the manufacture of the brake inaccuracies in the forming of the parts, in the punching of rivet holes therein, and in the assembly operation resulted in inaccurate positioning of the band with the result that one-half of the band would lie closer to the drum than the other. Consequently when the drum was applied this half of the band would engage the drum while the other half would be comparatively ineffective. To overcome this difficulty a flexible mounting was provided for the brake operating means. The application of the brake would now first cause the half of the band nearer the drum to engage the latter and the application to this half of the band of the torque of the rotated drum would bend the flexible support thus bringing the other half of the band into effective engagement. This arrangement presented the difficulty that the flexible support would frequently break after being subjected to bending strains, for a considerable period. Furthermore, inaccuracies in manufacture and assembly were sometimes so great as to require a lengthening of the brake linkage to take the nearer half of the brake band off the drum in the non-applied position of the brake. This gave rise to two difficulties; first, lengthening of the linkage rendered a portion of the movement of the brake pedal ineffective; second, the half of the brake band which was already too far from the drum was moved farther away from the latter and hence the flexible brake support was required to bend through a greater angle to effect an equalizing of the application of the two halves of the brake band, thus increasing liability of breakage of the support.

My adjustable brake anchorage overcomes the above difficulties by making it possible to secure uniform clearance between the brake band and the drum throughout the length of the band. Thus while retaining the advantages of a brake and brake operating means of extreme simplicity, I have secured an increase in the effective braking power and have rendered it unnecessary to provide a flexible support for the brake operating means, thus avoiding the possibility of failure in this part, and at the same time permitting an effective application of the brake throughout the entire range of movement of the brake pedal.

With my improved anchorage I am enabled to use effectively an extremely simple type of brake band and operating means. The band is preferably of one piece construction and the brake lining with which it is faced extends throughout almost the entire circumference of the drum thus increasing the effectiveness of the brake. There is but one adjustment on my improved brake assembly and the parts which provide this adjustment are so formed as to be cheaply manufactured and easily assembled.

From another point of view it is broadly the object of my invention to provide a brake anchoring means which will permit circumferential adjustment of the brake and also, preferably, variable radial positioning of the latter.

Other objects of my invention will appear from the following description taken in connection with the accompanying drawings.

In the drawings:

Figure 1 is a face view of the brake assembly;

Figures 2 and 3 show details of the anchoring means.

Referring to the drawings, 1 indicates the usual brake supporting means consisting of a disk secured to the axle housing, while 2 indicates the brake drum. 3 indicates the brake band which may consist of a steel strip having a one piece lining secured thereto. This construction enables application of the brake throughout substantially the entire circumference of the drum. The brake operating means is also of the utmost simplicity consisting of a two-armed rocking member 14 journaled upon a stub shaft 15. The stub shaft is supported from the disk 1 by means of a metallic strap member 16. This member is subjected to practically no bending strain for the reason that, as will later be made clear, my improved brake anchor provides uniformity in engagement of the band with the drum, and any rigid type of support may be used in place of the strap 16 if desired.

To the support or disk 1 is secured a member 4 serving as a brake anchor. This member is preferably formed of L-shape, one arm 5 of the L projecting outwardly over the brake drum 2. To the brake band 3 is secured a U-shaped strip 6 to receive the arm 5 of the member 4. To permit circumferential adjustment of the band with reference to the anchor, a bolt 7 is provided which passes through elongated slots 8 in the legs of the U-shaped strip 6 and has threaded engagement with the projecting arm 5 of the member 4. The bolt is provided with a nut 9. Means is provided for locking the nut and bolt against rotation in order to maintain the band in its adjusted position. This means comprises a member 10 conforming to the strip 6, having its ends apertured to permit the passage of the bolt 7 and provided with bendable ears 11 for engagement with flat sides of the bolt and nut.

Means is also provided for yieldably positioning the brake band with respect to the brake anchor and the brake drum. This means preferably comprises a coil spring 12 positioned between the said arm 5 of the anchor and a part associated with the brake band. To permit the use of a spring of some strength and flexibility and at the same time retain the advantage of compactness, the spring 12 does not directly engage member 6 but has engagement with a cup-shaped member 13 seated in a socket or aperture 14 in the bottom of the member 6, said cup having a flange for engaging the strip to prevent its movement in one direction. The locking strip 10, it may be noted, spans the cup 13, being apertured to permit its passage, and has no coaction with it.

It will be noted from the foregoing description that the brake band 3 may be circumferentially adjusted by manipulation of the bolt 7. The nut 9 and the locking member 10 serve to maintain the adjustment. However, it is to be observed that, when so adjusted, the band is still capable of radial movement with respect to the anchor, this movement being permitted by the provision of the slots 8 and being resisted by the spring 12.

It will now be seen that if owing to inaccuracies in manufacture and assembly the upper half, say, of the brake band should be closer to the drum than the lower half, it is merely necessary to manipulate the bolt 7 until uniformity in clearance is obtained. When this adjustment is secured the parts may be locked in position by the means already described. At the same time the spring 12 and slots 8 permit the band adjacent the anchor to engage the drum upon application of the brake. Since the upper and lower halves of the band engage the drum simultaneously it is apparent that the forces operating on the support 16 are substantially balanced with the result that the latter is not subject to bending strains and, for this reason, may be of rigid construction.

The structure described permits the use of a brake and a brake operating means of the utmost simplicity yet with a braking action which is comparable in effectiveness with that secured by the use of more complicated types of these devices.

While one illustrative embodiment of the invention has been described in detail, it is not my intention to limit its scope to that particular embodiment, or otherwise than by the terms of the appended claims.

What I claim is:

1. The combination of an anchor, a brake band provided with means adapted to receive said anchor, and means associated with said receiving means and said anchor and adapted to adjustably engage one of the latter for variably positioning said brake band circumferentially with reference to said anchor.

2. The combination of a brake anchor, a brake band and means for engagement with said anchor and with said brake band for adjustably positioning said brake band circumferentially with reference to said anchor, said means comprising a bolt and a nut.

3. In the combination as set forth in claim 2, common means cooperating with said bolt and nut and adapted to lock the same in adjusted position.

4. The combination of a brake anchor, a brake band provided with means adapted to receive said anchor, a bolt connecting said anchor and said receiving means for circumferential adjustment of said band, a nut upon said bolt, and common means for locking said bolt and said nut against rotation, said means spanning said receiving member.

5. The combination of a brake anchor, a brake band, means cooperating with said anchor and band permitting adjustment of said band circumferentially of said anchor, and means associated with said last named means for yieldably positioning said brake band with reference to said anchor.

6. In the combination as set forth in claim 5, a locking means associated with said cooperating means and spanning said yieldable means.

7. The combination of a brake drum, a brake anchor, a brake band adapted to engage said drum, means cooperating with said anchor and band to permit adjustment of said band circumferentially with respect to said anchor, and means associated with said last named means for yieldably holding said brake band out of engagement with said drum.

8. In a brake drum, a band, an anchor for said band, means upon the band associated with said anchor to provide circumferential adjustment therebetween and to permit radial movement of the band relative to the drum together with yielding means resisting the said radial movement in one direction.

In testimony whereof I affix my signature.

WALTER D. APPEL.